April 27, 1954
B. F. VALENTINE
2,676,451
RAKE STRUCTURE
Filed June 9, 1952
2 Sheets-Sheet 1
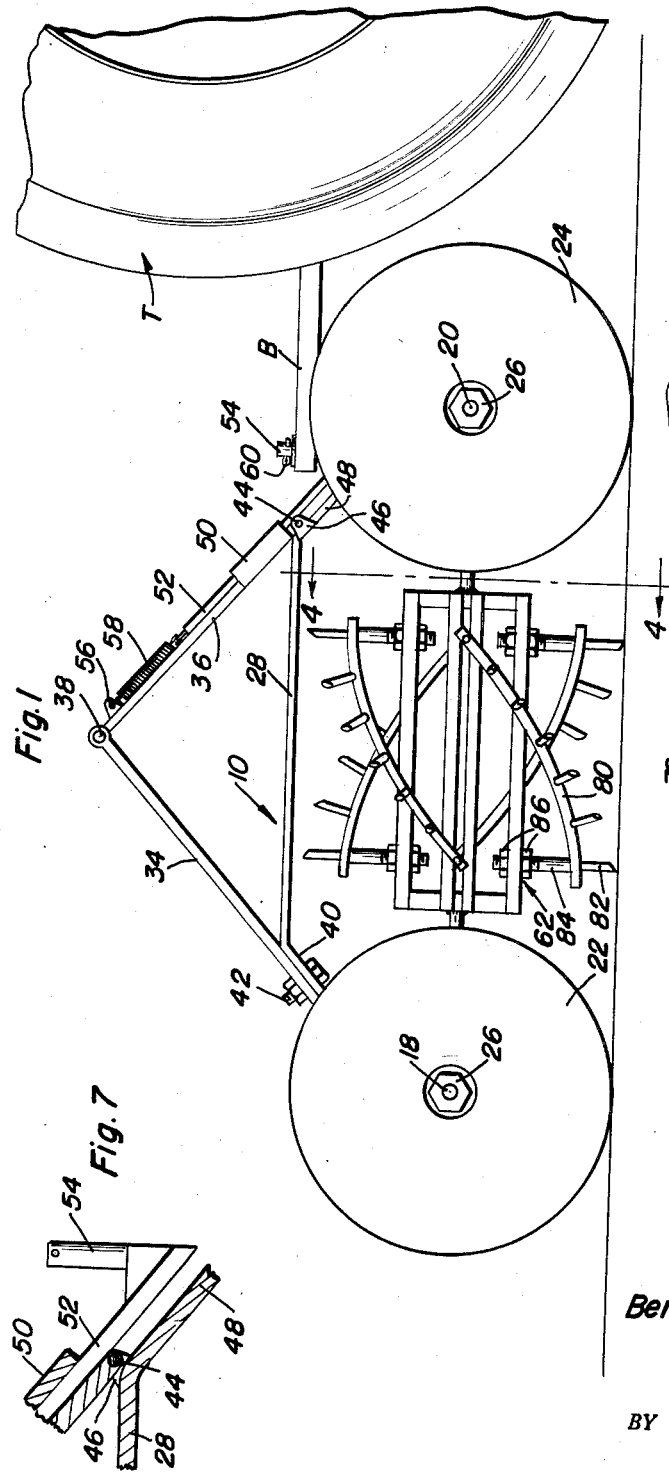
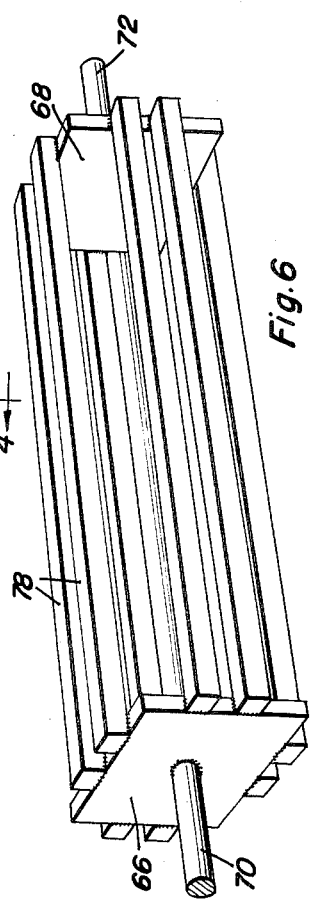
Benjamin F. Valentine
INVENTOR.
BY April 27, 1954
B. F. VALENTINE
2,676,451
RAKE STRUCTURE
Filed June 9, 1952
2 Sheets-Sheet 2
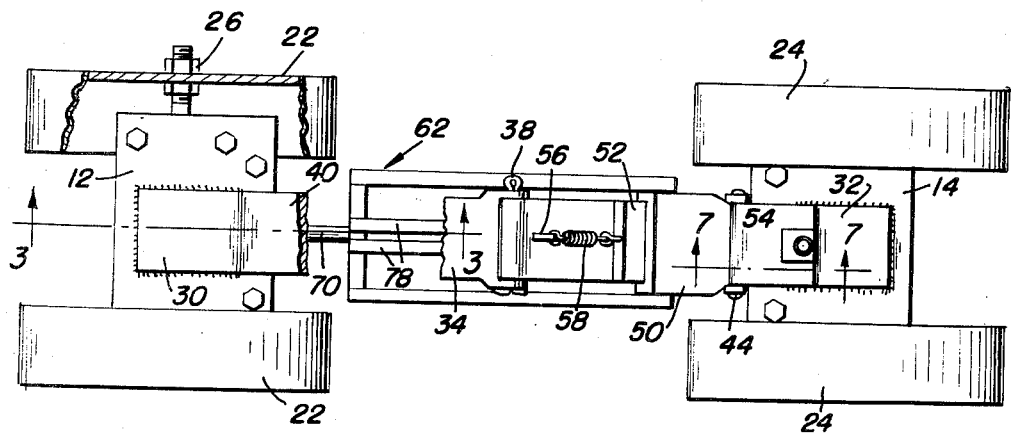
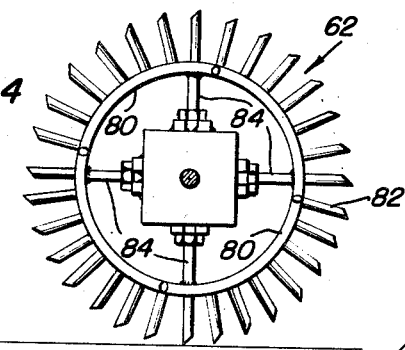
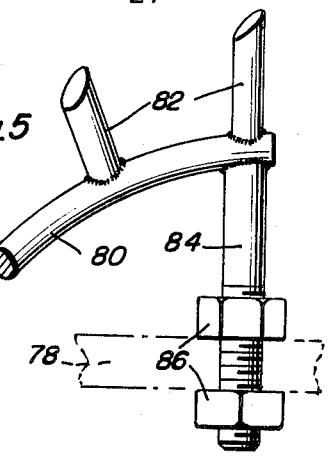
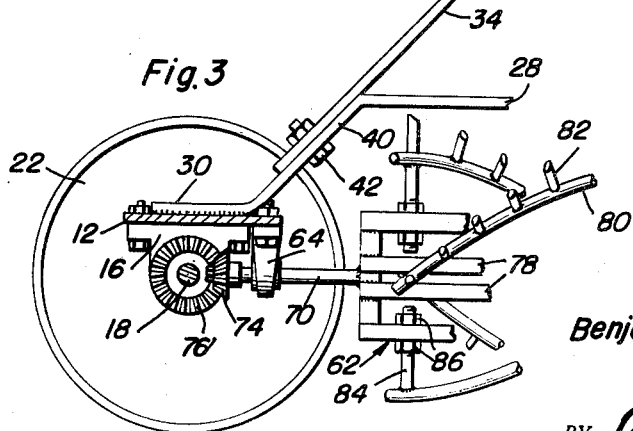
Benjamin F. Valentine
INVENTOR.

Patented Apr. 27, 1954

2,676,451

UNITED STATES PATENT OFFICE 2,676,451

RAKE STRUCTURE

Benjamin F. Valentine, Winnsboro, La.

Application June 9, 1952, Serial No. 292,510

3 Claims. (Cl. 56—376)

This invention relates to new and useful improvements in raking apparatus and the primary object of the present invention is to provide a wheeled support including forward and rear wheel axles that are operatively connected to a rotary rake member whereby the axles and rake member will rotate as a unit as the support is pulled by a towing vehicle.

Yet another object of the present invention is to provide a rake structure involving a rotary rake member having a plurality of radially adjustable toothed bars whereby the teeth on the bars may be adjusted a predetermined distance from the ground.

A further object of the present invention is to provide a rake structure having forward and rear pairs of wheels that are identical in construction to permit interchanging of the wheels.

A still further aim of the present invention is to provide a rake structure of the aforementioned character that is composed of parts which are quickly and readily assembled or disassembled in a convenient manner and which rake structure is small and compact in structure; strong and reliable in use; inexpensive to manufacture, service and repair; and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention;

Figure 2 is a plan view of Figure 1 and with parts broken away for the convenience of explanation;

Figure 3 is a longitudinal vertical sectional view taken substantially on the plane of section line 3—3 of Figure 2;

Figure 4 is a vertical sectional view taken substantially on the plane of section line 4—4 of Figure 1;

Figure 5 is an enlarged fragmentary view of one of the toothed bars and showing the manner in which the same is secured to a rotor (dotted lines);

Figure 6 is an enlarged perspective view of the rotor used in the invention; and, Figure 7 is an enlarged, detail, fragmentary vertical sectional view taken substantially on plane of section line 7—7 of Fig. 2.

Referring now to the drawings in detail, wherein for the purpose of illustration, there is disclosed a preferred embodiment of the present invention, the numeral 10 represents a wheeled support including forward and rear plates 12 and 14 to whose undersurfaces are bolted bearing assemblies 16 that rotatably support forward and rear axles 18 and 20.

Forward and rear wheels 22 and 24 are centrally apertured to receive the threaded ends of the axles 18 and 20. Pairs of clamp nuts 26 are receivably engaged on the ends of the axles and clamp the wheels therebetween as shown best in Figure 2. The inner sides of the wheels are open to receive the ends of the plates 12, 14.

An inverted U-shaped cross-member 28 extends between the plates 12 and 14 and its outwardly turned forward and rear ends 30 and 32 are welded to the upper faces of the plates 12 and 14, to rigidly connect and space the plates.

Means is provided for coupling the support 10 to towing vehicle such as a tractor T. This means comprises forward and rear arms 34 and 36 whose adjacent ends are pivotally connected together, as at 38. The lower forward end of the arm 34 is secured against the forward limb 40 of cross-member 28 by a fastener 42 and the lower rear end of arm 36 is pivoted, as at 44, to ears 46 on the rear limb 48 of the member 28.

A guide 50 on the arm 36 slidably receives a bar 52 whose rear end supports an upstanding coupling pin 54. The forward end of bar 52 is connected to an ear 56 on the upper end of arm 36 by a coil spring 58. Pin 54 extends upwardly through an aperture in the tractor draw bar B and receives a cotter pin 60 that retains the pin 54 engaged with the draw bar.

A rake member 62 is rotatably supported in bearings 64 secured to the under surfaces of the plates 12 and 14. Member 62 includes forward and rear square end walls 66 and 68. A forward stub shaft or axle 70 is fixed to and extends forwardly from the wall 66 to enter the bearing 64 on plate 12 and a rear stub shaft or axle 72 is fixed to and extends rearwardly from wall 68 to enter the bearing 64 on plate 14. Beveled gears 74 on the shafts 70 and 72 engage and mesh with beveled gears 76 on the axles 18 and 20.

Pairs of spaced parallel bars 78 are fixed to corresponding edges of the walls 66 and 68. Arcuate rods 80 extend between remote ends of adjacent pairs of bars 78 and these rods 80 support laterally projecting teeth 82. A bolt 84 is fixed to each end of each rod 80 and the threaded ends of the bolts 84 extend between bars 78 and carry clamp nuts 86 that clampingly secure the bolts 84 to the bars 78.

Having described the invention, what is claimed as new is:

1. An agricultural implement comprising a wheeled support including forward and rear wheel supporting axles, a raking member rotatably supported on said support and extending between the axles, and means operatively connecting each axle to said member for rotation of the member and the axles as a unit, said raking member including a pair of square end walls, a pair of spaced parallel bars connecting each side of one wall to corresponding sides of the other end wall, a plurality of arcuate rods extending between the bars of adjacent pairs of bars and terminally secured thereto, and laterally projecting teeth on each rod.

2. An agricultural implement comprising a wheeled support including forward and rear wheel supporting axles, a raking member rotatably supported on said support and extending between the axles, and means operatively connecting each axle to said member for rotation of the member and the axles as a unit, said raking member including a pair of square end walls, a pair of spaced parallel bars connecting each side of one wall to corresponding sides of the other end wall, a plurality of arcuate rods extending between the bars of adjacent pairs of bars and terminally secured thereto, and laterally projecting teeth on each rod, and adjustable means clampingly securing the ends of the rods between the bars of adjacent pairs of bars.

3. A rake structure comprising a pair of square end walls, a pair of spaced parallel bars connecting each side of one wall to corresponding sides of the other end wall, a plurality of arcuate rods extending between the bars of adjacent pairs of bars and terminally secured thereto, and laterally projecting teeth on each rod.

References Cited in the file of this patent
UNITED STATES PATENTS

| Number | Name | Date |
|---|---|---|
| 678,461 | Egan | July 16, 1901 |
| 960,950 | Keeser | June 7, 1910 |
| 2,158,299 | Oppenheim | May 16, 1939 |
| 2,656,664 | Silver | Oct. 27, 1953 |